United States Patent
Eilers et al.

(10) Patent No.: US 7,828,512 B2
(45) Date of Patent: Nov. 9, 2010

(54) ARRANGEMENT FOR SUPPORTING A SHAFT OF A VACUUM PUMP AND A VACUUM PUMP WITH SUCH AN ARRANGEMENT

(75) Inventors: Martin Eilers, Asslar (DE); Andreas Rippl, Wetzlar (DE); Christopher-Mark Rippl, Wetzlar (DE); Tobias Stoll, Angelburg-Goennern (DE)

(73) Assignee: Pfeiffer Vacuum GmbH, Asslar (DE)

( * ) Notice: Subject to any disclaimer, the term of this patent is extended or adjusted under 35 U.S.C. 154(b) by 638 days.

(21) Appl. No.: 11/890,918

(22) Filed: Aug. 6, 2007

(65) Prior Publication Data

US 2008/0138202 A1 Jun. 12, 2008

(30) Foreign Application Priority Data

Aug. 9, 2006 (DE) .................. 10 2006 037 187

(51) Int. Cl.
*F04D 29/052* (2006.01)
(52) U.S. Cl. .................... 415/104; 415/119; 415/199.5; 415/229
(58) Field of Classification Search ............. 415/90, 415/119, 199.5, 229, 104; 384/195, 196, 384/197, 198, 620
See application file for complete search history.

(56) References Cited

U.S. PATENT DOCUMENTS

| 3,069,016 | A | * | 12/1962 | Kiesskalt et al. | ............ 210/370 |
| 3,494,678 | A | * | 2/1970 | Fekete et al. | ................ 384/222 |
| 3,759,626 | A | * | 9/1973 | Becker | ........................ 415/90 |
| 3,950,964 | A | * | 4/1976 | Alexeeva et al. | .............. 464/78 |
| 4,872,767 | A | | 10/1989 | Knapp | |

FOREIGN PATENT DOCUMENTS

EP 1 619 400 A1 1/2006

* cited by examiner

*Primary Examiner*—Ninh H Nguyen
(74) *Attorney, Agent, or Firm*—Abelman, Frayne & Schwab

(57) ABSTRACT

An arrangement for supporting a shaft of a vacuum pump includes a first bearing for supporting the shaft at one of its end, a second bearing for supporting the shaft at another of its ends and formed as a rolling bearing, a holder for receiving the second bearing and including an oscillating base, a fixation member secured in the vacuum pump housing, metallic connection members for connecting the oscillating base with the fixation member and axial springs arranged between the oscillating base and the fixation member and providing for the axial stiffness of the holder which is greater than its radial stiffness thereof and greater than the axial stiffness of the first bearing.

8 Claims, 3 Drawing Sheets

ARRANGEMENT FOR SUPPORTING A SHAFT OF A VACUUM PUMP AND A VACUUM PUMP WITH SUCH AN ARRANGEMENT

BACKGROUND OF THE INVENTION

1. Field of the Invention

The present invention relates to an arrangement for supporting a shaft of a vacuum pump having a housing, and including a first bearing for supporting the shaft at one of its ends and generating forces in a direction of a shaft axis and having an axial stiffness and a second bearing for supporting the shaft at another of its ends and formed as a rolling bearing. The arrangement further includes a holder for receiving the second bearing and having an axial stiffness and a radial stiffness.

2. Description of the Prior Art

In turbomolecular pumps, shortly, turbopumps, a rapidly rotating rotor produces, in cooperation with a stator, a pumping effect. The rotor should be adequately supported, and different methods have been developed to this end. A successful commercial method includes using a rolling bearing at a forevacuum side and a permanent magnetic bearing at a high vacuum side end of the rotor shaft.

The permanent magnetic bearing is formed of ring-shaped, axially magnetized permanent magnets, with the magnetic rings being axially stacked upon each other. In the stack, magnetic rings, which have opposite polarities, are lying over each other. Two stacks with the same stack sequence of polarities but having different diameters are used, with respective stacks being mounted on the rotor and the stator.

In the normal position, the magnetic rings of both stacks are arranged at the same height, i.e., concentrically and coplannar. Because each layer of the stack has the same polarity, the support is based on the repelling effect. This has, however, an undesirable side effect. If the rotor is loaded axially and becomes deflected from its normal position, the magnetic rings are also displaced from their normal position. The repelling action in this case, produces additional axial forces. These additional forces increase the load acting on the forevacuum side rolling bearing and its axial support.

The load, which is applied to the forevacuum side rolling bearing, is critical for the following reasons: the bearing should be supported in the housing of the turbopump with a possibility of oscillating movement in order to keep the transmission of vibration low. Therefore, the oscillating ability of the bearing, on one hand, and the resistance against axial forces, on the other hand, present contradictory requirements.

Each elastically deformable structure can be associated with stiffness. This applies to a permanent magnetic bearing as well as to the mechanical components, e.g., to vibrating rings. In case of a permanent magnetic bearing, the generation of the axial force upon deflection from the normal position can be characterized by its stiffness.

The rolling bearing or its holder up to the present was embedded in an elastomeric material, so that the oscillating ability was provided in both axial and radial directions. However, the contradictory requirements cannot be taken into account in this way or can be taken into account only to an insufficient extent. In addition, the oscillating ability depends to a large extent on the elastomeric material itself.

Accordingly, an object of the invention is to provide an arrangement for supporting a shaft capable to meet these contradictory requirements.

SUMMARY OF THE INVENTION

This and other objects of the present invention, which will become apparent hereinafter, are achieved by providing a holder having a oscillating base, a fixation member secured in the vacuum pump housing, metallic connection members for connecting the oscillating base with the fixation member and enabling axial and radial displacements of the oscillating base, and axial springs arranged between the oscillating base and the fixation member and providing for the axial stiffness of the holder greater than the radial stiffness and greater than the axial stiffness of the first bearing.

The advantage of the holder according to the present invention consists in that the positional accuracy of the rolling bearing is taken over by metallic components, the oscillating base, the fixation member, and the metallic connection members. The positional inaccuracy which is caused, in the state of the art, by large tolerances of the elastomer and which is compensated by manual adjustment plays no role in the present invention. Therefore, the time-consuming adjustment process is eliminated by the present invention. Moreover, a high reproducibility in series production is achieved because the manufacturing precision of modern machine-tools is mirrored or reflected in metallic parts. The dependence of functioning of the holder from materials is noticeably smaller than in the state of the art. In addition to the metallic connection members, axial springs are used. Thereby, the stiffness of the holder in the axial direction is greater than in the radial direction. The axial springs and the metallic connection members are so dimensioned that the axial stiffness of the holder is greater than that of the first bearing. In this way, the holder takes into account the above-discussed contradictory requirements to the support for the second bearing and permits application of large axial forces, without impairing the ability of the second bearing to oscillate in both axial and radial directions. Another advantage of the inventive holder is a small space required therefor. A further advantage of the inventive holder consists in that no changes of its properties after a longer service life and at different temperatures occur. The advantages of the invention are particularly useful when the first bearing is formed as a permanent magnetic bearing because such bearing causes an excessive loading of the second bearing in the axial direction. Use of this combination is particularly advantageous in turbomolecular vacuum pumps, as these pumps are used to obtain particularly low pressures. Therefore, the use of a magnetic bearing at the high vacuum side is advantageous, as the invention simultaneously permits to use a rolling bearing at the forevacuum side, without the drawbacks this combination causes in the state of the art.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 2b a cross-sectional view along line B-B in FIG. 2a;

DETAILED DESCRIPTION OF THE PREFERRED EMBODIMENTS

Figure 1:
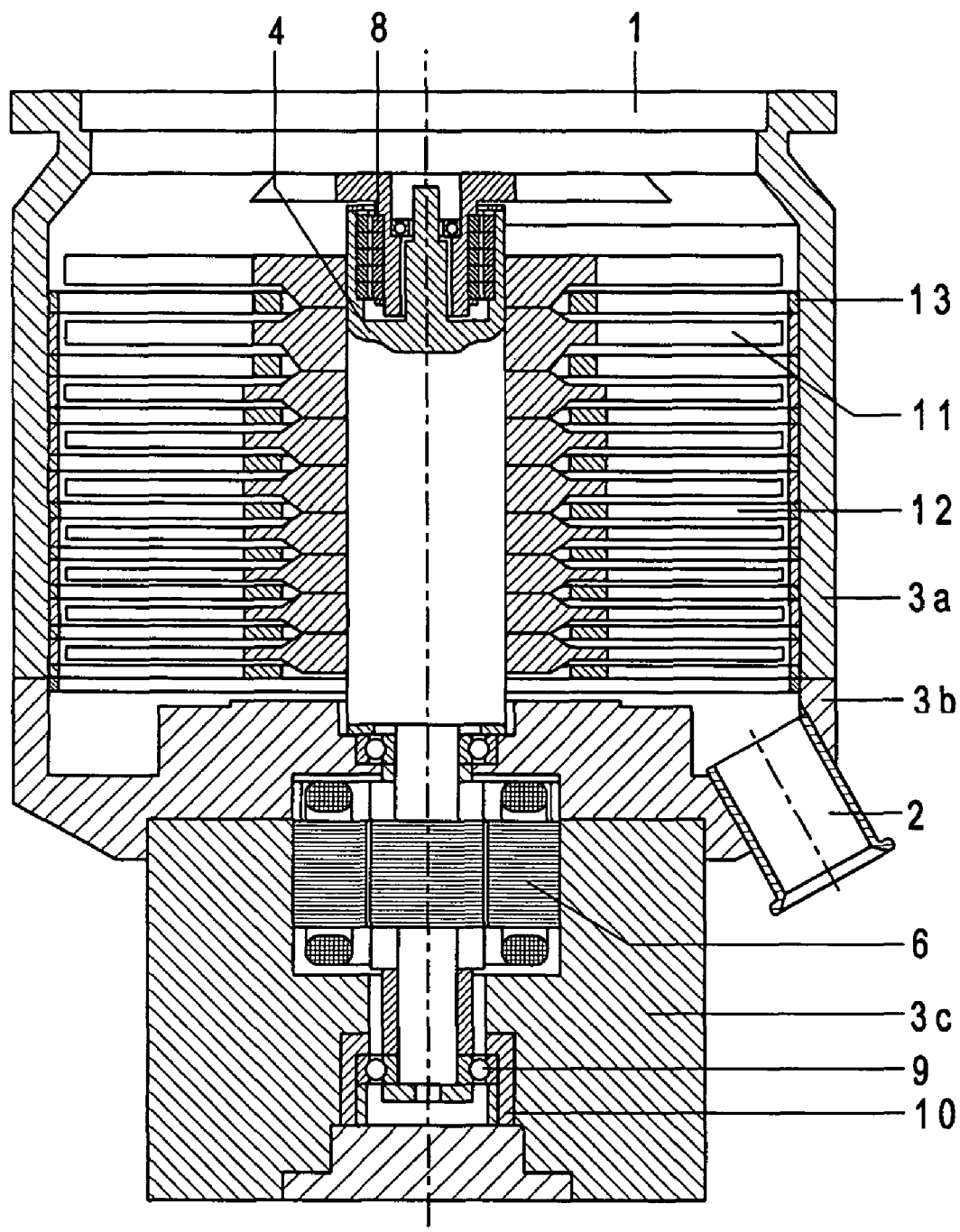
FIG. 1 a cross-sectional view of a turbomolecular pump with a shaft-supporting arrangement according to the present invention.

FIG. 1 shows a cross-sectional view of a turbomolecular pump in which an arrangement according to the present invention for supporting a shaft can be advantageously used. The turbomolecular pump has a housing which is formed of several parts 3a, 3b, 3c and has a gas inlet and a gas outlet 2. In the housing a plurality of stator discs 12 are arranged at a distance from each other, with spacer rings 13 located therebetween. A plurality of rotor discs 11 which are provided with vanes and which project into free spaces provided by the spacer rings, are arranged on a shaft 4. The shaft 4 is rotatable supported at its opposite ends by a first, high vacuum-side bearing 8 and a second, forevacuum-side bearing 9. A drive 6 drives the shaft 4, together with rotor discs 11, with high speed whereby a pumping effect, which is a result of cooperation of the stator discs 12 and the rotor discs 11, is produced. The high vacuum-side bearing 8 is formed as a permanent magnet bearing. The forevacuum-side bearing 9 is secured in a holder 10 that is secured in the housing part 3c. The holder 10 is shown only schematically in FIG. 1 and its structure will be explained more precisely with reference to FIGS. 2-4.

Figure 2B:
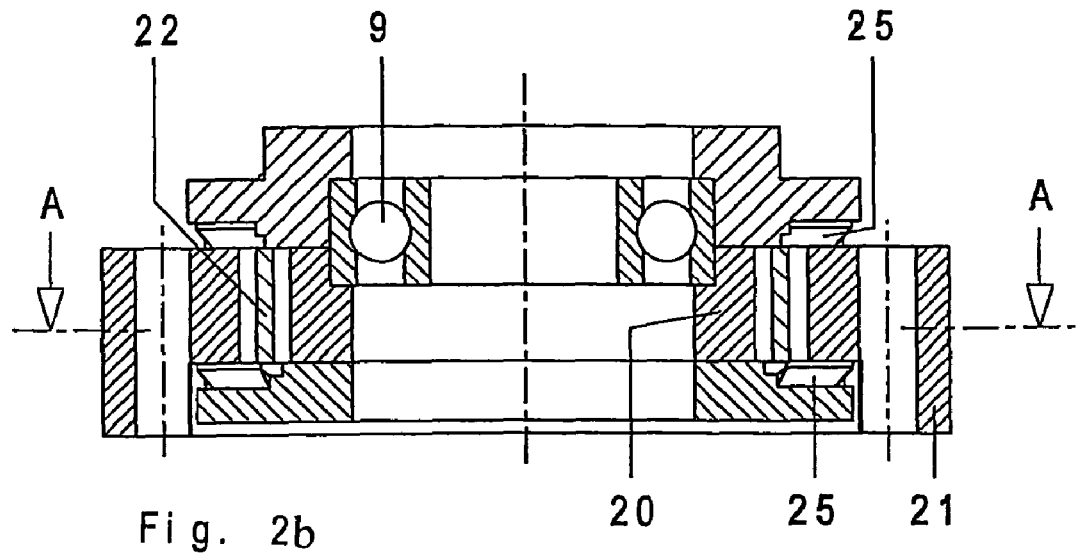

FIG. 2b shows a cross-sectional view of a first embodiment of the holder 10. The bearing 9 is formed as a ball bearing and is fixed on a oscillating base 20 that is connected with a fixation member 21 by metallic connection members 22. The connection members 22 are formed as flexible bars of which at least three are uniformly circumferential arranged. Axial springs 25 are arranged between the fixation member 21 and the oscillating base 20. The axial springs 25 can be formed as ondular washers or as elastomeric rings. As a result, the stiffness of the holder 10 in the axial direction is greater than in the radial direction. The use of the elastomeric rings insures a better heat removal.

Figure 2A:
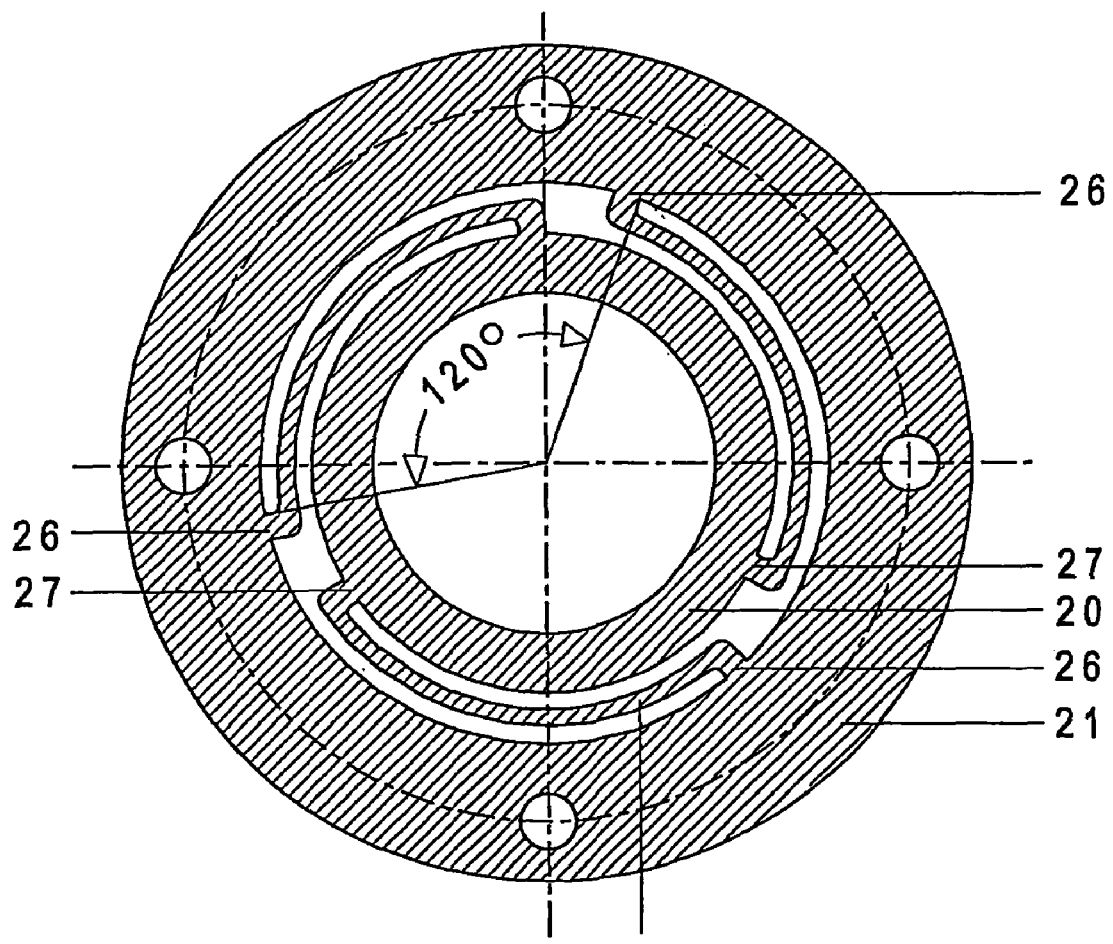
FIG. 2a an axide cross-sectional view of a first embodiment of a shaft-supporting arrangement according to the present invention.

FIG. 2a shows, as it has already been mentioned above, a cross-sectional view along line A-A in FIG. 2b. As shown in FIG. 2a, the connection members 22 in form of flexible bars are attached to the fixation member 21 at start points 26 which are provided thereon and which are spaced circumferentially from each other by an angle of 120°, and are attached to the oscillating base 20 at end points 27 provided thereon and spaced from the respective start points 26 in the circumferential direction. By selecting the length of the flexible bars, their thickness, and the formation of the start and end points, the bending characteristics of the bars and, thereby, the oscillation characteristics of the oscillating base 20 can be determined. The bars extend between the start and end points in form of spirals or arcuate sections.

The shape of the metallic connection members 22 provides for axial and radial displacements of the base 20. The stiffness in the radial and axial directions is different and is adapted to the requirements of the combination of the first bearing 8 and the second bearing 9.

The stiffness in the axial direction and the stiffness in the radial direction are determined by the geometry of the bars and by dimensions of the axial springs. In particular, the axial stiffness of the holder 10 should be greater than the stiffness of the first, permanent magnet bearing. Deflection of the rotor in the axial direction does not result anymore in the loss of the ability of the bearing 9 to pivot in the axial direction.

Figure 3:
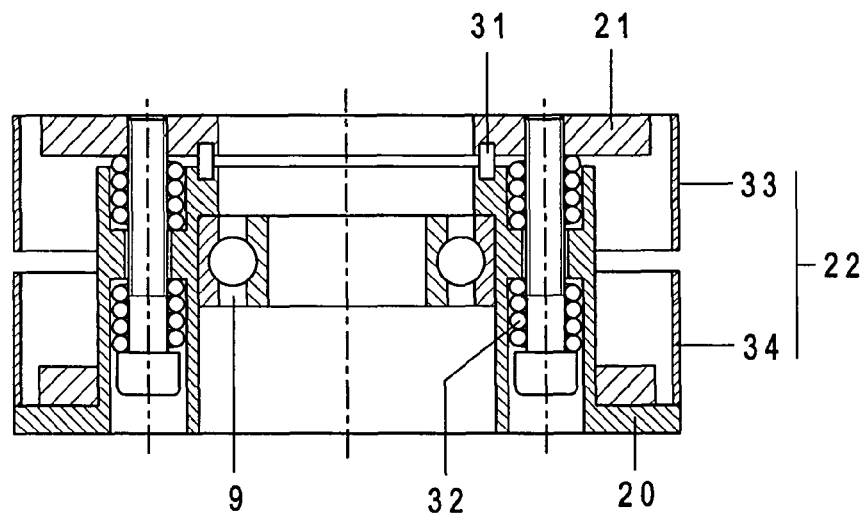
FIG. 3 an axial cross-sectional view of a second embodiment of a shaft supporting arrangement according to the present invention.
Figure 4:
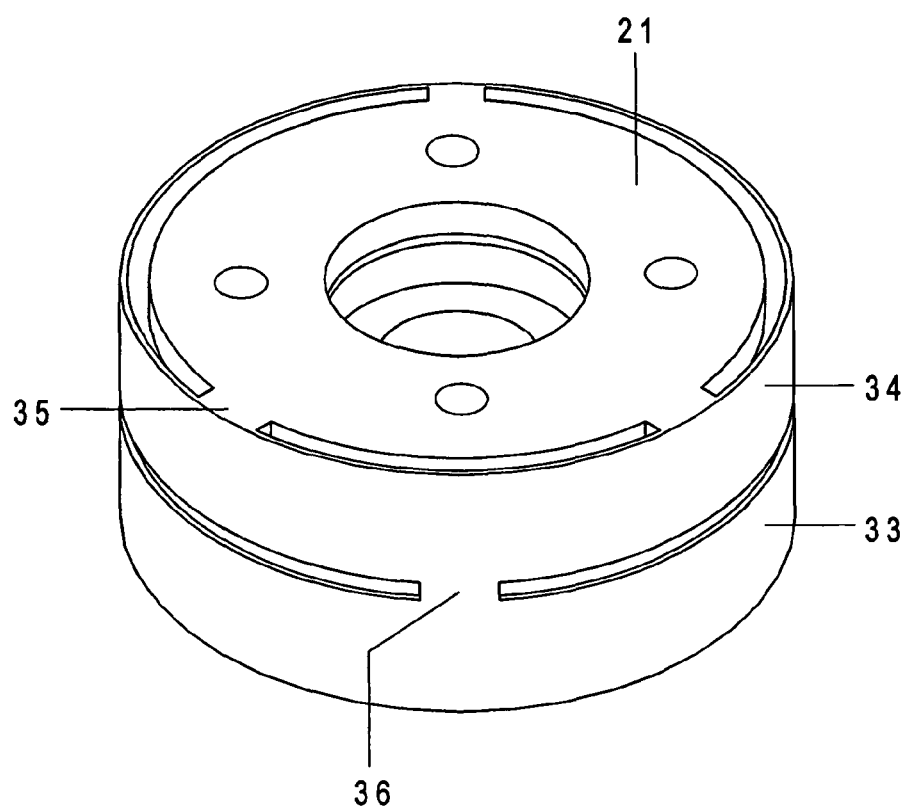
FIG. 4 a perspective view of the arrangement shown in FIG. 3.

FIG. 3-4 show a second embodiment of the holder 10. In this embodiment the holder 10 has two plates one of which functions as a oscillating base 20 and the other of which functions as fixation member 21.

The metallic connection members, which connect the two plates, are formed by two axially offset relative to each other and coaxial cylinders 33, 34 which are connected with each other and with the two plates by webs. There is further provided an elastomeric damping member 31 that damps the displacement of the oscillating base 20 in the radial direction. For the axial displacement, an axial spring 32 is provided.

FIG. 4 shows a perspective view of the arrangement of the two cylinders 33 and 34 and which clarifies the arrangement of the webs. Three radial webs 35, which are equidistantly distributed in the circumferential direction, connect the cylinder 34 with the fixation member 21. A plurality of circumferential distributed axial webs 36 connects the cylinders 33, 34 with each other. For clarity sake, the webs are shown at an increased scale. The axial webs 36 provide for radial displacement of the cylinders 33, 34 relative to each other. The radial webs 35 provide, in particular, for an axial displacement, however, they also enable a tilting displacement. Thereby, displacement characteristics in different directions are decoupled from each other to a most possible extent, and the dimensioning of the webs can be separated also to a most possible extent, without the dimensions of one type of webs influencing the dimensions of another type of webs. The fact that the axial and radial webs are arranged so that they are circumferentially offset relative to each other, permits to increase deformation margin of the holder 10 and to realize a cardanic suspension.

Though the present invention was shown and described with references to the preferred embodiments, such are merely illustrative of the present invention and are not to be construed as a limitation thereof, and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An arrangement for supporting a shaft of a vacuum pump having a housing, the arrangement comprising a first bearing for supporting the shaft at one end thereof and generating forces in a direction of a shaft axis and having an axial stiffness, a second bearing for supporting the shaft at another end thereof and formed as a rolling bearing, and a holder for receiving the second bearing and having an axial stiffness and a radial stiffness, the holder including a oscillating base, a fixation member secured in the vacuum pump housing, metallic connection members for connecting the oscillating base with the fixation member and enabling axial and radial displacements of the oscillating base, and axial springs arranged between the oscillating base and the fixation member and providing for the axial stiffness of the holder greater than the radial stiffness thereof and greater than the axial stiffness of the first bearing.

2. An arrangement according to claim 1, wherein both the oscillating base and the fixation member are annular and are arranged in a plane.

3. An arrangement according to claim 1, wherein the metallic connection members comprise at least three flexible members distributed over a circumference and formed as webs.

4. An arrangement according to claim 1, wherein the fixation member and the oscillating base are plate-shaped and are axially offset relative to each other.

5. An arrangement according to claim 4, wherein the metallic connection members comprises two, axially offset relative to each other, cylinders connected with each other and with the fixation member and the oscillating base-forming plates, respectively, by at least three webs.

6. An arrangement according to claim 5, wherein the webs between the cylinders and the webs between the cylinders and plates are circumferentially offset relative to each other.

7. An arrangement according to claim 1, wherein the first bearing is a permanent magnetic bearing.

8. A turbomolecular vacuum pump, comprising a housing; a shaft supported in the housing; a plurality of stator discs arranged in the housing and separated from each other by spacer rings; a plurality of rotor discs projecting into free spaces between the stator discs provided by the spacer rings and cooperating with the stator discs to produce a pumping effect, and supported on the shaft; and an arrangement for supporting the shaft and including a first bearing supporting the shaft at one end thereof and generating forces in a direction of a shaft axis and having an axial stiffness, a second bearing for supporting the shaft at another end thereof and formed as a rolling bearing, and a holder for receiving the second bearing and having an axial stiffness and a radial stiffness, the holder including a oscillating base, a fixation member secured in the vacuum pump housing, metallic connection members for connecting the oscillating base with the fixation member and enabling axial and radial displacements of the oscillating base, and axial springs arranged between the oscillating base and the fixation member and providing for the axial stiffness of the holder, greater than the radial stiffness thereof and greater than the axial stiffness of the first bearing.

* * * * *